(12) United States Patent
Purdy et al.

(10) Patent No.: US 7,730,041 B2
(45) Date of Patent: Jun. 1, 2010

(54) DATA ABSTRACTION BASED SERIALIZATION

(75) Inventors: Douglas M. Purdy, Bellevue, WA (US); Sowmyanarayanan K. Srinivasan, Redmond, WA (US); Bradford H. Lovering, Seattle, WA (US); Donald F. Box, Bellevue, WA (US); Gopala Krishna R. Kakivaya, Sammamish, WA (US); Natasha H. Jethanandani, Seattle, WA (US); Stefan H. Pharies, Seattle, WA (US); Stephen T. Swartz, Seattle, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 10/925,567

(22) Filed: Aug. 25, 2004

(65) Prior Publication Data

US 2006/0047679 A1 Mar. 2, 2006

(51) Int. Cl.
*G06F 17/00* (2006.01)
(52) U.S. Cl. .................. 707/694; 707/804; 715/234
(58) Field of Classification Search .............. 707/104.1, 707/10, 100, 1, 3, 102; 715/234
See application file for complete search history.

(56) References Cited

U.S. PATENT DOCUMENTS

| | | | | |
|---|---|---|---|---|
| 4,249,241 A * | 2/1981 | Aberle et al. ............... 710/200 |
| 5,864,864 A * | 1/1999 | Lerner ....................... 707/102 |
| 5,909,570 A * | 6/1999 | Webber ....................... 703/13 |
| 6,301,585 B1 * | 10/2001 | Milne .................... 707/103 R |
| 6,477,701 B1 * | 11/2002 | Heistermann et al. ....... 717/108 |
| 6,941,510 B1 * | 9/2005 | Ozzie et al. ................. 715/234 |
| 7,149,965 B1 * | 12/2006 | Layman et al. ............. 715/209 |
| 2003/0154202 A1 * | 8/2003 | Dinker et al. ............... 707/100 |
| 2004/0044678 A1 * | 3/2004 | Kalia et al. ................. 707/102 |
| 2004/0117763 A1 * | 6/2004 | Fjallstrom et al. ........... 717/108 |
| 2004/0167937 A1 * | 8/2004 | Sirois et al. ................. 707/203 |
| 2004/0215645 A1 * | 10/2004 | Redpath ..................... 707/100 |
| 2005/0071342 A1 * | 3/2005 | Calusinski ................. 707/100 |
| 2005/0071809 A1 * | 3/2005 | Pulley ....................... 717/108 |
| 2005/0091228 A1 * | 4/2005 | Venkatesh et al. ........... 707/100 |
| 2005/0256895 A1 * | 11/2005 | Dussault ..................... 707/102 |

* cited by examiner

*Primary Examiner*—Khanh B Pham
*Assistant Examiner*—Leon Harper
(74) *Attorney, Agent, or Firm*—Workman Nydegger

(57) ABSTRACT

Serialization and deserialization using data contracts. The data contract specifies data types that are serialized and deserialized for data objects that are associated with the data contract. During serialization, the data contract associated with the data object is identified. Then, the data fields that correspond to those specified data field types are extracted from the data object and serialized into a serialization format. During deserialization, the serialization mechanism receives a serialized data structure having a particular serialization format. A data contract is then identified as being associated with the serialized data structure. After deserialization of the serialized data structure into abstract data, a corresponding data object is populated with data fields that correspond only with those data field types specified in the data contract. Accordingly, data abstraction is enabled while serializing and deserializing.

33 Claims, 6 Drawing Sheets

DATA ABSTRACTION BASED SERIALIZATION

BACKGROUND OF THE INVENTION

1. The Field of the Invention

The present invention relates to computing technology; and more specifically, to mechanisms for serializing and deserializing data objects by serializing and deserializing only abstract representations of data as specified by a data contract.

2. Background and Related Art

Computing technology has transformed the way we work and play. Computing systems now take a wide variety of forms including desktop computers, laptop computers, tablet PCs, Personal Digital Assistants (PDAs), household devices and the like. The functionality of the computing system is directed by software. Software is a sequence of computer-executable instructions that, when executed, causes the computing system to perform the functionality.

Object-oriented programming has developed as a mechanism to organize the authoring of software using logical units called objects that interact with one another. An object comprises one or more data fields that are representative of properties of the object, and zero or more methods (or pointers to methods) that include computer-executable code that relate to behavior of the object. Objects may interact by calling a method that is exposed by another object. Such objects may also be referred to herein as "data objects" as pointers to methods and computer-executable instructions that formulate the methods themselves may be broadly considered to be "data".

When in-memory, the data object is a collection of associated data fields and methods. However, it is often necessary to write or transmit the data object. In order to write or transmit a data object, the in-memory representation of the data object is serialized into a sequence of bytes that conforms with a serialization format. Similarly, the data object may be deserialized into an in-memory representation when reading or otherwise receiving the serialized data object.

Conventionally, the entire data object is typically serialized and deserialized. Accordingly, serialization and deserialization processes are often customized for each data object classification, thereby requiring significant resources for authoring, storing and processing serialization mechanisms for each potential object type. For example, Java objects may have one serialization mechanism, while WINDOWS® objects may have another serialization mechanism. Different serialization mechanisms may also be used for different serialization formats as well. For example, binary and XML may each have their own serialization mechanism. Furthermore, the entire data object may be larger than the actual abstract data of interest, thereby further wasting processing, memory and (if transmitted) network bandwidth resources.

Accordingly, what would be advantageous are serialization and deserialization mechanisms that are abstracted from the data object type and serialization format, and that do not require the serialization and deserialization of the entire data object.

BRIEF SUMMARY OF THE INVENTION

The foregoing problems with the prior state of the art are overcome by the principles of the present invention, which allow for serialization using a concept referred to herein as "data contracts". The data contract may specify one or more data types that are serialized for data objects that are associated with the data contract. Similarly, the data contract may also specify one or more data types that are to be deserialized and populated into a corresponding data object during deserialization.

During serialization, the data object that is to be subjected to serialization is accessed. In conventional serialization, the entire data object would be serialized. However, in accordance with the principles of the present invention, the data object is associated with a data contract that specifies which data field types are to be extracted and serialized. Then, the data fields that correspond to those specified data field types are extracted from the data object. The extracted data fields, rather than the entire data object, are serialized into a serialization format. Accordingly, the serialization of a data object results in serialization of only abstract data. This alleviates other applications that later access the serialized data from having to understand the form of the data object from which the data was originally extracted. Further, it protects the serializing application from disclosing perhaps sensitive information regarding the structure of the data object.

During deserialization, the serialization mechanism receives a serialized data structure having a particular serialization format. A data contract is then identified as being associated with the serialized data structure. After deserialization of the serialized data structure into abstract data, a corresponding data object is populated with data fields that correspond only with those data field types specified in the data contract. Alternatively, the data fields may be retrieved from the serialized data structure and populated into the data object one data field at a time.

Accordingly, the principles of the present invention allow for flexible serialization and deserialization in a manner that the nature of the data object subjected to serialization and deserialization is abstracted from the data that is actually serialized and deserialized. The serialization mechanism may also serve to notify other parties of the services that the corresponding service provides, as well as the serialization format and data associated with data objects provided and consumed by the service.

Specifically, upon receiving a request for a description of services, the serialization mechanism evaluates a service object to identify one or more methods provided by the service object. Then, the parameters of the service object are evaluated to determine which have data contracts associated therewith. For each data contract that is associated with one or more of the plurality of data parameters, the serialization mechanism converts the data contract into a schematized description of the data field types identified by the data contract. The serialization mechanism then provides a schematized description of the one or more methods provided by the service object, along with each of the schematized descriptions of the data contracts.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more filly apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
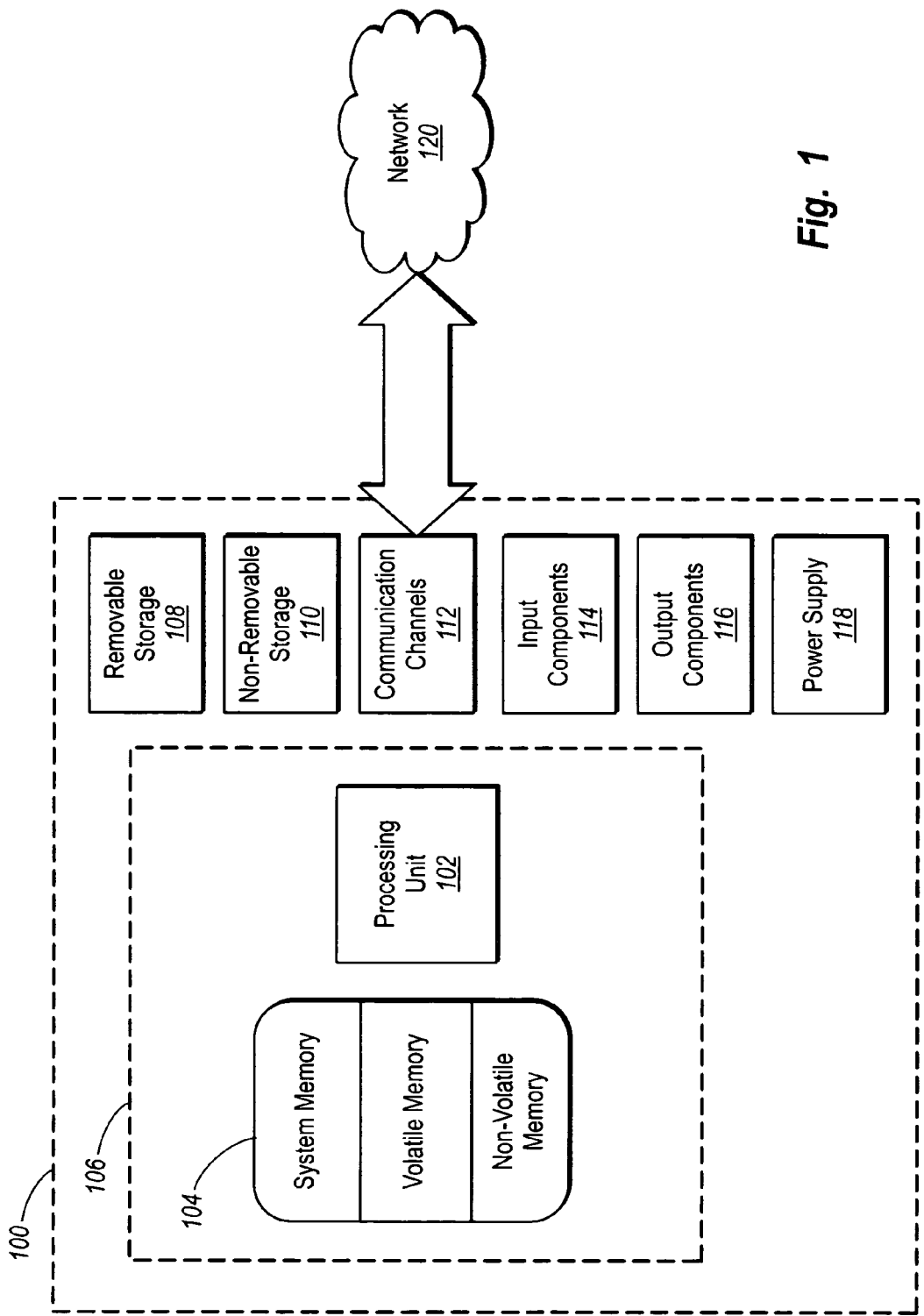
FIG. 1 illustrates a suitable computing system that may implement features of the present invention.

The principles of the present invention relate to a mechanism that serializes and deserializes using a concept referred to herein as "data contracts". The data contract may specify one or more data types that are serialized for data objects that are associated with the data contract. Similarly, the data contract may also specify one or more data types that are to be deserialized and populated into a corresponding data object during deserialization.

During serialization, the data contract associated with the data object is identified. Then, the data fields that correspond to those specified data field types are extracted from the data object and serialized into a serialization format. During deserialization, the serialization mechanism receives a serialized data structure having a particular serialization format. A data contract is then identified as being associated with the serialized data structure. In addition to deserialization of the serialized data structure into abstract data, a corresponding data object is populated with data fields that correspond only with those data field types specified in the data contract. The data contract may be the same for a data object regardless of whether serialization or deserialization is performed, although the principles of the present invention do not require this.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also FIG. 1 shows a schematic diagram of an example computer architecture usable for these devices be implemented in hardware.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
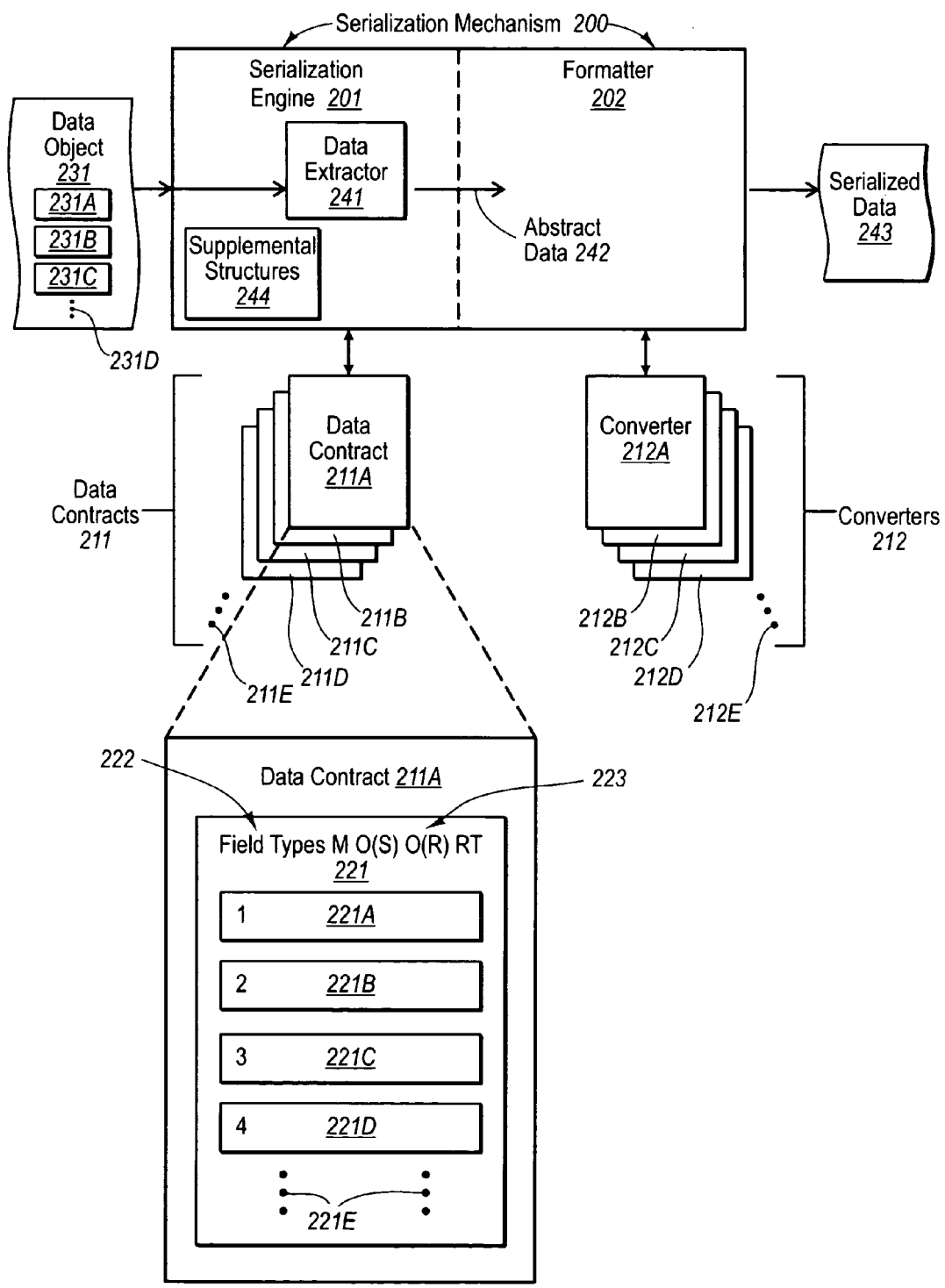
FIG. 2 schematically illustrates a process of serialization using a serialization mechanism in accordance with the principles of the present invention.

FIG. 2 schematically illustrates a process of serialization using a serialization mechanism in accordance with the principles of the present invention. The serialization mechanism 200 includes a serialization engine 201 and a formatter 202. The serialization engine 201 and formatter 202 may be integrated within the same routine or may be implemented by separate routines without affecting the principles of the present invention. The serialization engine 201 and the formatter 202 may be components executed within the environment of the computing system 100 of FIG. 1. However, the principles of the present invention are independent of and not limited to any particular hardware environment. The remaining structure shown in FIG. 2 will be described with respect to FIG. 3, which illustrates a flowchart of a method of serializing in accordance with the principles of the present invention.

In accordance with the principles of the present invention, a data object is serialized by merely serializing abstract data extracted from the data object, rather than serializing the structure surrounding the abstract data. Accordingly, entities accessing the serialized data need not understand the structure of the data object from which the data was extracted. Also, the serialization does not disclose perhaps sensitive information regarding the form of the data object.

Figure 3:
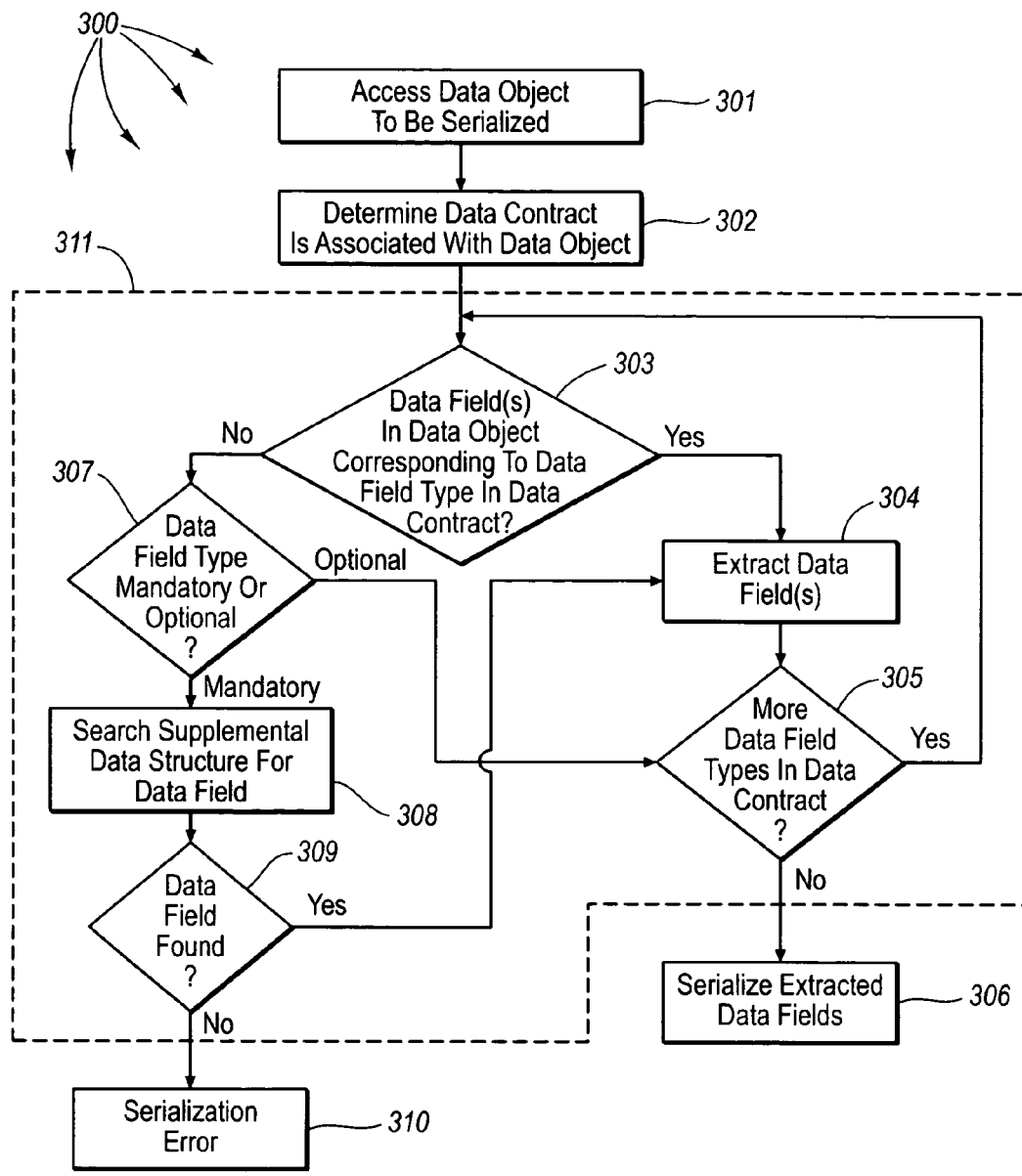
FIG. 3 illustrates a flowchart of a method of serializing in accordance with the principles of the present invention.

Referring to FIG. 3, a data object to be subjected to serialization is accessed (act 301). For instance, the serialization engine 201 in FIG. 2 may access the data object 231. The data object 231 may be any data object type. For purposes of illustrates, the data object 231 is illustrated as including data fields 231A through 231C amongst potentially others as represented by the vertical ellipses 231D.

It is then determined that the data object is associated with a "data contract" (act 302). In this description and in the claims, a "data contract" is defined as an identification of one or more data field types that correspond to data fields that are to be serialized.

For instance, the serialization engine 201 has access to a collection of data contracts 211 that may include any number of data contracts. As illustrated, the data contracts 211 include data contracts 211A through 211D amongst potentially many others as represented by the ellipses 211E. The data contract may correspond to a particular logical entity type. For example, data contract 211A may correspond to a person data type. There is no limit, however, to the types of data objects that may have a corresponding data contract.

FIG. 2 shows data contract 211A in exploded view as including a number of data field types 211. Each data field type may include a data field type identification 222 as well as one or more other designators 223 relating to the data type. For example, suppose that the data contract 211A corresponded generally to people data objects. The data field type 221A may be, for example, a name data type, data field type 221B may be an age data type, data field type 221C may a gender data type, data field type 221D may be an address data type, and so forth. Shown designators include "M" for mandatory, "O(s)" for optional on the send or serialization side, "O(r)" for optional on the receive or deserialization side, and "RT" for round trip enabled. Each of these designations will be described in further detail below.

Returning back to FIG. 3, it is then determined whether or not the data object has a data field corresponding to a data field type identified in the data contract (decision block 303). For instance, suppose the serialization engine 201 of FIG. 2 has identified data contract 211A as being associated with the accessed data object 231. The serialization engine 201 would evaluate data field type 221A to determine if there any associated data fields amongst any of the data fields 231A through 231D of the data object 231 that correspond to that data field type 221A. For example, suppose that the data field type 231A is a name data type. The serialization engine 201 would evaluate all of the data fields of data object 231 to determine if there is a "name" field.

If it is determined that the data object does have a data field corresponding to the data field type (Yes in decision block 303), then the corresponding data is extracted from the data object (act 304). For example, the data extractor component 241 may extract the appropriate data field(s) (e.g., specific name or names) corresponding to the data field type (e.g., name data type) from the data object.

If there are no more data field types specified in the data contract (No in decision block 305), then any extracted data fields are serialized (act 306). Alternatively, a data field may be serialized immediately after being extracted. For instance, the serialization (act 306) may occur immediately after extraction (act 304), rather than waiting until all data fields have been extracted (No in decision block 305). The extracted data is represented by abstract data 242 in FIG. 2. This data is independent of the data object and includes only the extracted data, not the entire data object. The formatter 202 then determines what serialization format to serialize into, and selects from a library of converters 212 an appropriate converter corresponding to that serialization format. For example, the library of converters 212 is illustrated as including corresponding converters 212A, 212B, 212C, 212D, amongst others as represented by the ellipses 212E. Examples of serialization formats include, for example, binary, eXtenstible Markup Language (XML), amongst any other serialization formats, whether conventional, or whether not yet existing. The formatter 202 then uses the appropriate converter component (e.g., converter component 212A) to serialize the abstract data 242 into the appropriate serialization format.

Returning to FIG. 3, if there are yet more data field types in the data contract to evaluate (Yes in decision block 305), then flow proceeds back to decision block 303, where it is determined for the next data field type in the data contract, whether there are any data fields in the data object corresponding to that data field type (act 303), and the process repeats.

If at any point, there is no data fields in the data object corresponding to a data field type found in the data contract (No in decision block 303), it is then determined whether the data field type is mandatory or optional (decision block 307). This determination may be made by referring to the designators 223 in the corresponding data field type in the data contract. For example, "M" means that the data field type is mandatory, whereas "O(s) means that the data field type is optional on the send or serialization side.

If the data field type is optional (Optional in decision block 307), then flow proceeds back to decision block 305, where serialization is performed (act 306) if there are not any more data field types in the data contract to evaluate, or where the next data field type is evaluated (decision block 303) if there are more data field types to evaluate.

If, on the other hand, the data field type is mandatory (Mandatory in decision block 307), then a supplemental data structure corresponding to the data object may be searched (act 308) for the presence of an associated data field. For example, the serialization engine 201 of FIG. 2 may search a supplemental data structure 244 associated with the data object 231 for the presence of a data field that corresponds to the current data field type in the data contract. If such a data field is found in the supplemental data structure (Yes in decision block 309), then that data field is extracted (act 304) and added to the collection of abstract data. If such a data field is not found in the supplemental data structure (No in decision block 309), then the serialization engine 201 indicates that the serialization has failed (act 310). Of course, the serialization error of act 310 may never occur if the serialization mechanism guarantees that the data field is always found in the supplemental data structure. The existence of the supplemental data structure will be explained below with reference to the round trip (RT) designator that may be used during deserialization.

Optionally, the supplemental data structure 244 may also be searched if the data field type is determined to be optional (Optional in decision block 307). In that case, if a corresponding data field is not found in the supplemental data structure, then the flow simply proceeds to decision block 305, where it is determined whether or not there are more data field types in the data contract to be evaluated.

The dashed box 311 in FIG. 3 represents an evaluation process for each data type to be evaluated from the data contract. The process may be repeated until either a Mandatory data field type having no corresponding data field is encountered (No in decision block 309), or until all of the data field types have been evaluated (No in decision block 305).

Accordingly, the method 300 operates to extract abstract data from a data object corresponding to a data contract, where the nature of the abstract data is defined by the data contract, and operates to serialize such abstract data in a manner that is independent of the data object format. The method 300 may be repeated for many data objects, regardless of whether or not different data contracts are associated with those other data objects, and regardless of the serialization format to be used.

Before proceeding to a description of deserialization, a specific example of a data object will be described along with a specific indication of how a data contract is associated with that data object, and how corresponding data fields may be identified in the data object. The following is C sharp source code for an example data object with line numbering added for clarity:

```
1.      namespace SomeOtherNamespace {
2.          [DataContract(Namespace="Example", Name="Person")]
3.          public class AnotherPersonThatSomeOneElseCreated {
4.              [DataMember("_name")]
5.              public string FullNameOfThisPerson;
6.          }
7.      }
```

The data contract associated with the data object may be identified by the combination of the namespace and name of the data contract. Line 2 represents metadata that includes all of the information needed to identify the data contract. Specifically, the namespace of the data contract is "Example". The name of the data contract is "Person". Thus, the data contract is identified.

The data object is of the class "AnotherPersonThatSomeOneElseCreated" (see line 3) which includes only one data field (see line 5). The data field is a string having the name "FullNameOfThisPerson". However, the preceding line (line 4) indicates that this string data field should be considered as being of type "_name" for purposes of evaluating the data contract. Accordingly, when the data field type "string_name" is evaluated, it may be construed that the string "FullNameOfThisPerson" corresponds to that data field type. That string may then be extracted as the abstract data to be serialized.

The following illustrates another example data object:

```
1.      namespace Example {
2.          [DataContract]
3.          class Person {
4.              [DataMember]
5.              private string _name;
6.          }
7.      }
```

In this example, the name of the namespace for the data object and the data contract are the same being "Example". Accordingly, there is no need for further designation of the data contract namespace in line 2. Furthermore, the name of the data contract and the name of the data object are the same being "Person". Accordingly, there is no need for further designation of the data contract name in line 2. Lastly, the name of the data field specified in the data object and the data field type is the same being "string _name". Therefore, there is no further need to designate the data field type in line 4.

Figure 4:
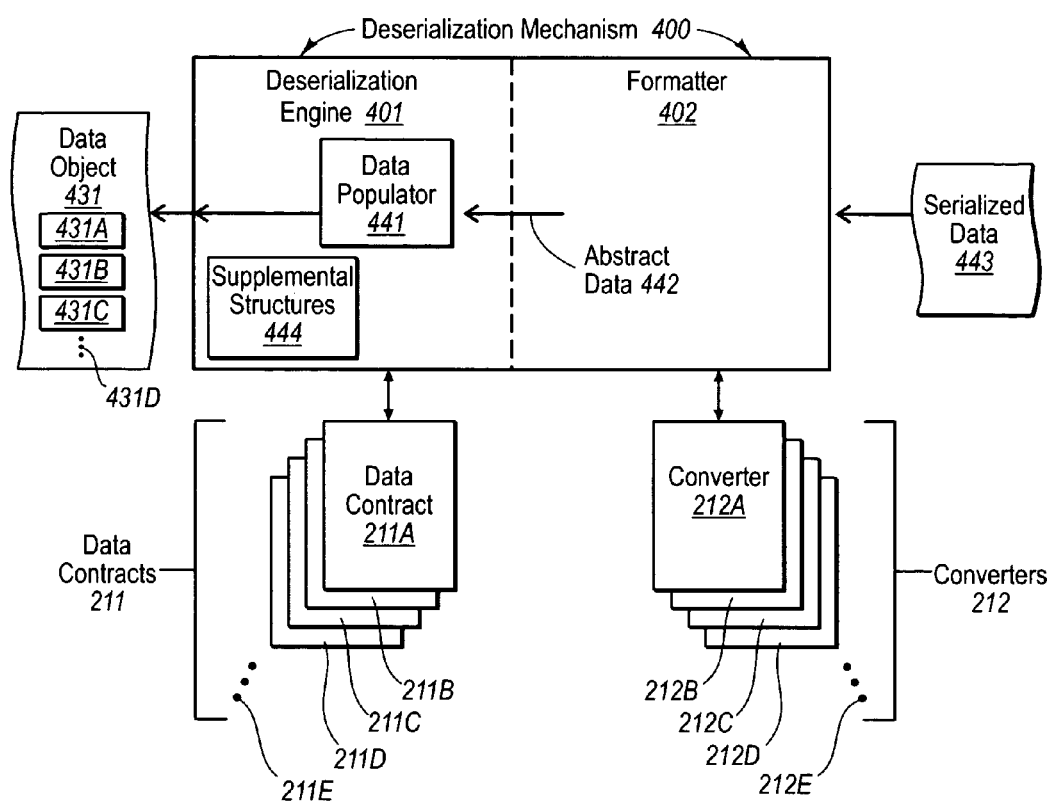
FIG. 4 schematically illustrates a process of deserialization using a deserialization mechanism in accordance with the principles of the present invention.
Figure 5:
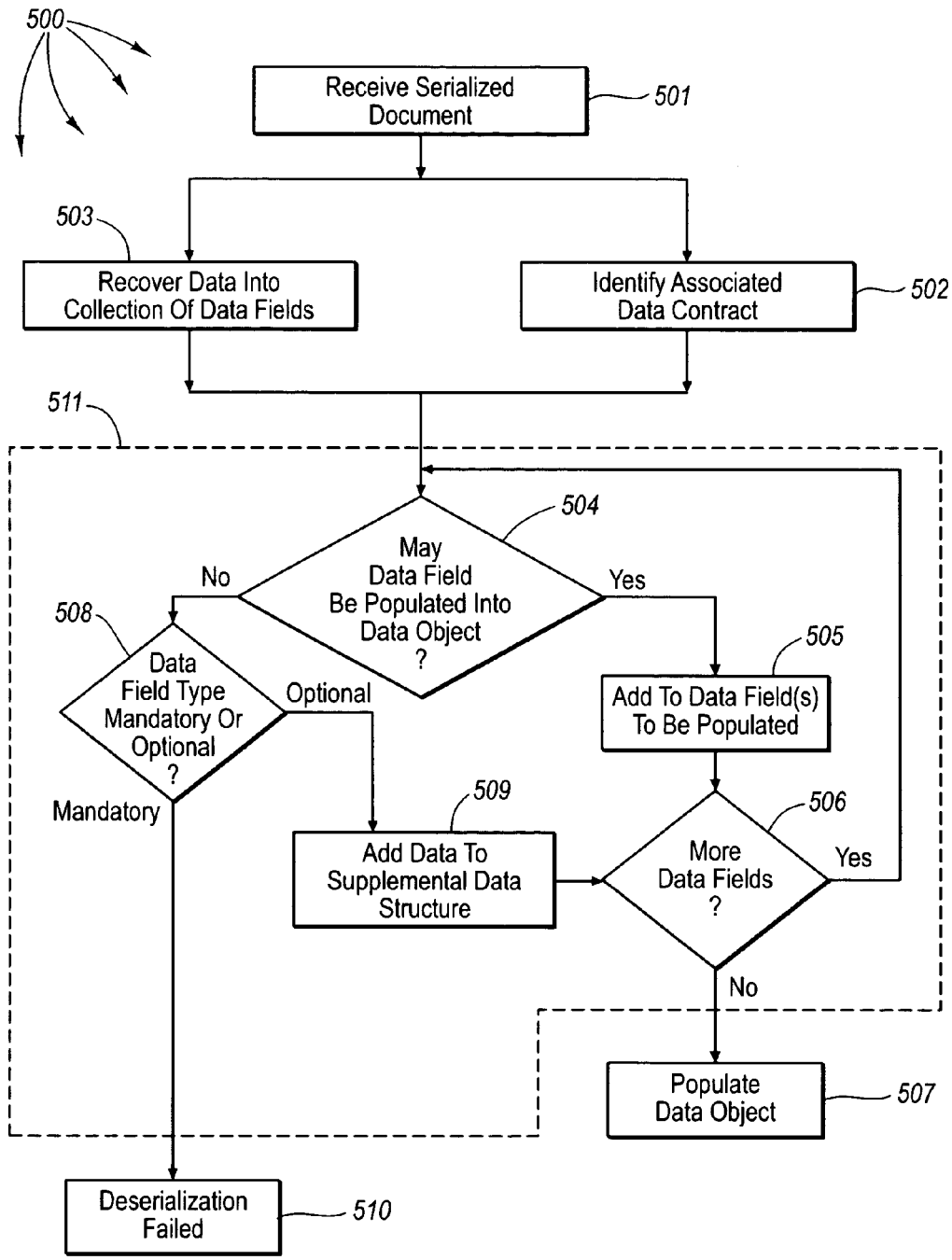
FIG. 5 illustrates a flowchart of a method of deserializing in accordance with the principles of the present invention.

FIG. 4 schematically illustrates a process of deserialization using a deserialization mechanism in accordance with the principles of the present invention. The deserialization mechanism 400 of FIG. 4 is similar to the serialization mechanism 200 of FIG. 2. The deserialization mechanism 400 also includes a deserialization engine 401, which may be similar to the serialization engine 201 of FIG. 2. A formatter 402 may be the same as the formatter 202 of FIG. 2. The formatter 402 may also have access to the converters library 212, whereas the deserialization engine 401 may also have access to the data contracts 211. The remainder of FIG. 4 will be described with respect to FIG. 5, which illustrates a flowchart of a method 500 of deserializing in accordance with the principles of the present invention.

First, the deserialization mechanism 400 receives a serialized data structure having a serialization format (act 501). For example, the formatter 402 receives the serialized data 443, which is in a particular serialization format.

The deserialization mechanism 400 identifies a data contract associated with the serialized data structure (act 502). This identification may be performed by evaluating metadata associated with the serialized document. The identification may be rules based. For example, the rules may specify that serialized documents received from a particular sender, and which have a particular document name correspond to a particular data contract. These rules may be set by an administrator or may be hard-coded by the software developer, or set in some other way.

In addition, the deserialization mechanism recovers one or more data fields from the serialized data structure that are of the one or more data field types identified by the data contract (act 503). The formatter 402 may accomplish this by selecting an appropriate one of converters 212 that corresponds to the serialization format of the serialized data 443. The formatter 402 thus recovers abstract data 442.

For each extracted data field that corresponds to a data field type identified in the data contract, the deserialization engine determines whether the data field may be populated into the data object (decision block 504). This may be determined by the data populator 441. If the data field may be populated into the corresponding data object, (Yes in decision block 504), the data populator 441 adds this data field to a collection of data items to be populated into the data object (act 505), or alternatively immediately populates the data object with the data field. If there are no more data fields to be populated into the data object (No in decision block 506), then the data object is populated (act 507). Otherwise, (Yes in decision block 506), the next recovered data field is evaluated (decision block 504), where the process is repeated.

If at any time it is determined that a recovered data field may not be populated into the data object (No in decision block 504), then it is determine whether the data field is mandatory or optional (decision block 508). This may be determined by reviewing the corresponding data field type in the corresponding data contract. If an optional receive flag ("O(r)") is not set, then the data field type must be understood by the data object and the data field is determined to be mandatory. If the optional receive flag is set, then the data field type is optional on the receive end.

If the data field is optional (Optional in decision block 508), then the data field is populated into a supplemental data structure instead of into the data object. For example, the data populator 441 may provide the data field into the supplemental data structure 444. In one embodiment, act 509 is only performed if a round trip designator (RT) is set in the corresponding data field type of the data contract. In either case, the flow then proceeds to decision block 506, where it is determined if there are more data fields to be populated (decision block 506). If, on the other hand, the data field is mandatory (Mandatory in decision block 508), then the deserialization is indicated to have failed (act 510).

This process included within the dashed box 511 may be repeated for all recovered data fields until either there are no more data fields to evaluate (No in decision bloc 506), or until the deserialization fails (act 510). The process within dashed box 511 may also repeat for data field types for which there is no corresponding data field retrieved for the data object, although the nature of the flow would change slightly as will now be described. Specifically, the data field may not be populated into the data object (No in decision block 504) since the data field does not exist. If the data field type is optional (Optional in decision block 508), flow proceeds directly to decision block 506, where it is determined whether there are any more retrieved data fields to be evaluated or any more data field types for which there is no corresponding retrieved data field. If the data field type is mandatory (Mandatory in decision block 508), the deserialization fails (act 510).

The method 500 may be repeated for any received serialized document regardless of the format of the serialized document, and regardless of which data contract is associated with the serialized document.

Accordingly, the principles of the present invention provide a serialization mechanism in which the abstract data is extracted from the data object and serialized as opposed to serializing the entire data object. Similarly, a deserialization mechanism recovers the abstract data and populates the abstract data into the data object rather than deserializing the entire data object. Accordingly, the serialization and deserialization mechanism is compatible with multiple serialization formats and data object types, without having to expose the nature of the data object type that is processed in-memory.

Figure 6:
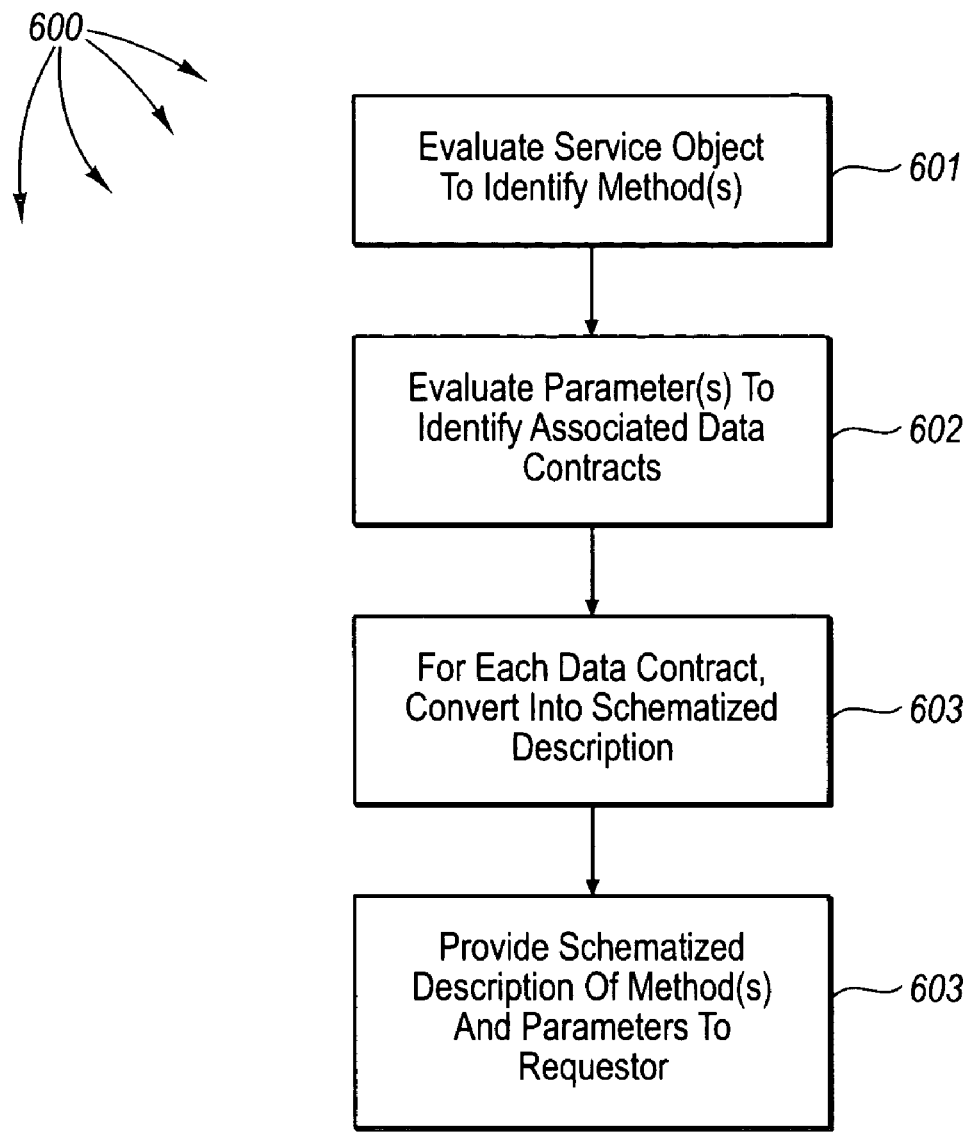
FIG. 6 illustrates a flowchart of a method for expressing capabilities of a service in accordance with the principles of the present invention.

FIG. 6 illustrates a flowchart of a method for expressing capabilities of a service in accordance with the principles of the present invention. This process may be performed before serialization and deserialization described above. The method 600 may be performed upon receiving a request for an expression of the service's capabilities, although that is not required.

First, a service object is evaluated to identify one or more methods provided by the service object (act 601). This service object may be, for example, the entire web service. The parameters of the method(s) are then evaluated to determine which have data contracts associated therewith (act 602). For each data contract, the data contract is then converted into a schematized description of the parameter (act 603). For example, the serialization mechanism 200 may be configured to generate an XML Schema Description (XSD) document for each parameter based on the associated data contract. The service may then provide a schematized description of the methods (e.g., in the form of a Web Services Description Language (WSDL)) along with an associated schematized description of the parameters accepted (e.g., in the form of an XSD document for each parameter).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that includes a serialization mechanism, a method for serializing one or more data fields of a data object rather than serializing the entire data object itself, the method comprising the following:
   an act of accessing a data object to be subjected to serialization;
   an act of determining the data object is associated with a data contract which is independent and separated from the data object and that specifies one or more data field types that are to be serialized for data objects that are associated with the data contract, the data contract further including designators that designate whether serialization of the data field types is mandatory or, alternatively, optional;
   for each data field type in the data contract that is associated with the data object, determining whether or not the data object has one or more corresponding data fields, such that only the specific data fields specified in the data contract are accessed and serialized and while refraining from accessing and serializing data fields that are not specifically specified in the data contract and without regard to content of the data fields, and such that selection of data fields to be serialized from the data object is based upon the separate and independent data contract and rather than being based upon actual data contained within the data fields;
   if it is determined that the data object does have one or more data fields corresponding to one of the data field types of the data contract,
      extracting the one or more data fields from the data object;

determining a format to serialize the extracted one or more data fields in; and serializing only the extracted one or more data fields of the data object into the serialization format and rather than the entire data object; and if it is determined that there are no data fields in the data object corresponding to a particular data field type found in the data contract, determining whether the particular data field type comprises a mandatory or, alternatively, an optional data field type by examining designators that are present within the data contract, and wherein if it is determined the particular data field type comprises a mandatory data field type, searching a supplemental data structure associated with the data object for an associated data field corresponding to the particular data field type the associated data field having been written to the supplemental data structure during a previous deserialization of serialized data to the data object, and extracting the data field to be serialized from the supplemental data structure, and wherein if the search of the supplemental data structure fails the method further includes generating the serialization error.

2. A method for serializing in accordance with claim 1, wherein the data object is a first data object, and at least one of the one or more data field types that are specified in the data contract as being serialized is mandatory, the method further comprising:

an act of accessing a second data object to be subject to serialization;

an act of determining the second data object is also associated with the data contract;

an act of determining that the second data object does not have a data field corresponding to the at least one mandatory data field type specified in the data contract; and an act of indicating that the serialization has failed.

3. A method for serializing in accordance with claim 1, wherein the data object is a first data object, and at least one of the one or more data field types that are specified in the data contract as being serialized is optional, the method further comprising:

an act of accessing a second data object to be subject to serialization;

an act of determining the second data object is also associated with the data contract;

an act of determining that the second data object does not have a data field corresponding to the at least one optional data field type specified in the data contract;

an act of extracting the one or more data fields from the second data object that correspond to the one or more data field types identified by the data contract without extracting any data field corresponding to the at least one optional data field type specified in the data contract; and an act of serializing the extracted one or more data fields of the second data object.

4. A method for serializing in accordance with claim 1, wherein the data object is a first data object and the data contract is a first data contract, the method further comprising the following:

an act of accessing a second data object to be subjected to serialization;

an act of determining the data object is associated with a second data contract that specifies one or more data field types that are serialized for data objects that are associated with the second data contract;

an act of extracting the one or more data fields from the second data object that correspond to the one or more data field types identified by the second data contract; and an act of serializing the extracted one or more data fields of the second data object into a serialization format.

5. A method for serializing in accordance with claim 4, wherein the serialization format that the one or more data fields extracted from the first data object is serialized into is the same as the serialization format that the one or more data fields extracted from the second data object is serialized into.

6. A method for serializing in accordance with claim 4, wherein the serialization format that the one or more data fields extracted from the second data object is serialized into is different that the serialization format that the one or more data fields extracted from the second data object is serialized into.

7. A method for serializing in accordance with claim 1, wherein the data object is a first data object, the method further comprising the following:

an act of accessing a second data object to be subjected to serialization;

an act of determining the data object is associated with the data contract;

an act of extracting the one or more data fields from the second data object that correspond to the one or more data field types identified by the data contract; and an act of serializing the extracted one or more data fields of the second data object into a serialization format.

8. A method for serializing in accordance with claim 7, wherein the serialization format that the one or more data fields extracted from the first data object is serialized into is the same as the serialization format that the one or more data fields extracted from the second data object is serialized into.

9. A method for serializing in accordance with claim 7, wherein the serialization format that the one or more data fields extracted from the second data object is serialized into is different that the serialization format that the one or more data fields extracted from the second data object is serialized into.

10. A method for serializing in accordance with claim 1, further comprising the following:

an act of determining that there is no corresponding data field in the data object for one of the data field types identified by the data contract;

an act of searching a data structure associated with the data object for a data field that is associated with the data object and with the data field type identified by the data contract; and an act of extracting from the data structure the data field that is associated with the data object and with the data field type identified by the data contract.

11. A method in accordance with claim 1, further comprising:

an act of receiving a request for a description of services;

an act of evaluating a service object to identify one or more methods provided by the service object;

an act of evaluating a plurality of parameters of the service object to determine which have data contracts associated therewith;

for each data contract that is associated with one or more of the plurality of data parameters;

an act of converting the data contract into a schematized description of the data field types identified by the data contract; and an act of providing a schematized description of the one or more methods provided by the service object, along with each of the schematized descriptions of the data contracts.

12. A computer program product for use in a computing system that has one or more processors, the computer program product comprising one or more computer-readable storage media having stored computer-executable instructions that, when executed by the one or more processors, cause the computing system to instantiate a serialization mechanism and cause the serialization mechanism to perform the method recited in claim 1.

13. A computer program product for serializing in accordance with claim 12, wherein the data object is a first data object, and at least one of the one or more data field types that are specified in the data contract as being serialized is mandatory, the method further comprising:
   an act of accessing a second data object to be subject to serialization;
   an act of determining the second data object is also associated with the data contract;
   an act of determining that the second data object does not have a data field corresponding to the at least one mandatory data field type specified in the data contract; and
   an act of indicating that the serialization has failed.

14. A computer program product for serializing in accordance with claim 12, wherein the data object is a first data object, and at least one of the one or more data field types that are specified in the data contract as being serialized is optional, the method further comprising:
   an act of accessing a second data object to be subject to serialization;
   an act of determining the second data object is also associated with the data contract;
   an act of determining that the second data object does not have a data field corresponding to the at least one optional data field type specified in the data contract;
   an act of extracting the one or more data fields from the second data object that correspond to the one or more data field types identified by the data contract without extracting any data field corresponding to the at least one optional data field type specified in the data contract; and
   an act of serializing the extracted one or more data fields of the second data object.

15. A computer program product for serializing in accordance with claim 12, wherein the data object is a first data object and the data contract is a first data contract, the method further comprising the following:
   an act of accessing a second data object to be subjected to serialization;
   an act of determining the data object is associated with a second data contract that specifies one or more data field types that are serialized for data objects that are associated with the second data contract;
   an act of extracting the one or more data fields from the second data object that correspond to the one or more data field types identified by the second data contract; and
   an act of serializing the extracted one or more data fields of the second data object into a serialization format.

16. A computer program product for serializing in accordance with claim 12, wherein the data object is a first data object, the method further comprising the following:
   an act of accessing a second data object to be subjected to serialization;
   an act of determining the data object is associated with the data contract;
   an act of extracting the one or more data fields from the second data object that correspond to the one or more data field types identified by the data contract; and
   an act of serializing the extracted one or more data fields of the second data object into a serialization format.

17. A computer program product for serializing in accordance with claim 12, the method further comprising the following:
   an act of determining that there is no corresponding data field in the data object for one of the data field types identified by the data contract;
   an act of searching a data structure associated with the data object for a data field that is associated with the data object and with the data field type identified by the data contract; and
   an act of extracting from the data structure the data field that is associated with the data object and with the data field type identified by the data contract.

18. A computer program product in accordance with claim 12, the method further comprising:
   an act of receiving a request for a description of services;
   an act of evaluating a service object to identify one or more methods provided by the service object;
   an act of evaluating a plurality of parameters of the service object to determine which have data contracts associated therewith;
   for each data contract that is associated with one or more of the plurality of data parameters;
   an act of converting the data contract into a schematized description of the data field types identified by the data contract; and
   an act of providing a schematized description of the one or more methods provided by the service object, along with each of the schematized descriptions of the data contracts.

19. In a computing system that includes a deserialization mechanism, a method for deserializing a serialized data structure having a serialization format, the method comprising the following:
   an act of receiving a serialized data structure having a serialization format;
   an act of identifying a data contract associated with the serialized data structure and which is independent and separated from the serialized data structure, the data contract identifying one or more data field types that are to be populated within an associated data object, the data contract further including designators that designate whether serialization of the data field types is mandatory or, alternatively, optional;
   an act of recovering one or more data fields from the serialized data structure that are of the one or more data field types identified by the data contract;
   determining whether the one or more data fields may be populated into the data object;
   an act of populating the associated data object with the recovered one or more data fields if it is determined that the one or more data fields may be populated into the data object; and
   if it is determined that any particular data field may not be populated into the data object, determining, based on the designators included with the data contract, whether the particular data field is a mandatory or, alternatively, an optional data field, as specified specifically by the data contract and by examining designators that are present within the data contract, and upon determining that the data field type comprises an optional data field type, populating the supplemental data structure associated with the data object with the particular data field such that during a subsequent serialization of the data object, the particular data field may be serialized with the data fields of the data object.

20. A method for deserializing in accordance with claim 19, wherein the serialized data structure is a first serialized data structure, the method further comprising the following:
- an act of receiving a second serialized data structure having a serialization format;
- an act of identifying that the data contract is also associated with the second serialized data structure; and
- an act of determining that a data field corresponding to one of the one or more data field types identified by the data contract may not be populated into a data object associated with the second serialized data structure.

21. A method for deserializing in accordance with claim 20, further comprising the following:
- an act of identifying as mandatory the data field corresponding to the one of the one or more data field types identified by the data contract that may not be populated into the data object associated with the second serialized data structure; and
- an act of failing the deserialization of the second serialized data structure.

22. A method for deserializing in accordance with claim 20, further comprising the following:
- an act of identifying as optional the data field corresponding to the one of the one or more data field types identified by the data contract that may not be populated into the data object associated with the second serialized data structure;
- an act of recovering one or more data fields from the serialized data structure that are of the one or more data field types identified by the data contract; and
- an act of populating the associated data object with the recovered one or more data fields.

23. A method in accordance with claim 19, wherein the serialization format of the first serialized data structure is different than the serialization format of the second serialized data structure.

24. A method in accordance with claim 19, wherein the serialization format of the first serialized data structure is the same as the serialization format of the second serialized data structure.

25. A method in accordance with claim 19, further comprising the following:
- an act of receiving a request for a description of services;
- an act of evaluating a service object to identify one or more methods provided by the service object;
- an act of evaluating a plurality of parameters of the service object to determine which have data contracts associated therewith;
- for each data contract that is associated with one or more of the plurality of data parameters;
- an act of converting the data contract into a schematized description of the data field types identified by the data contract; and
- an act of providing a schematized description of the one or more methods provided by the service object, along with each of the schematized descriptions of the data contracts.

26. A computer program product for use in a computing system that includes one or more processors, the computer program product comprising one or more computer-readable storage media having stored computer-executable instructions that, when executed by the one or more processors, cause the computing system to instantiate a deserialization mechanism, and cause the deserialization engine to perform the method recited in claim 19.

27. A computer program product for deserializing in accordance with claim 26, wherein the serialized data structure is a first serialized data structure, the method further comprising the following:
- an act of receiving a second serialized data structure having a serialization format;
- an act of identifying that the data contract is also associated with the second serialized data structure; and
- an act of determining that a data field corresponding to one of the one or more data field types identified by the data contract may not be populated into a data object associated with the second serialized data structure.

28. A computer program product for deserializing in accordance with claim 27, the method further comprising the following:
- an act of identifying as mandatory the data field corresponding to the one of the one or more data field types identified by the data contract that may not be populated into the data object associated with the second serialized data structure; and
- an act of failing the deserialization of the second serialized data structure.

29. A computer program product for deserializing in accordance with claim 27, the method further comprising the following:
- an act of identifying as optional the data field corresponding to the one of the one or more data field types identified by the data contract that may not be populated into the data object associated with the second serialized data structure;
- an act of recovering one or more data fields from the serialized data structure that are of the one or more data field types identified by the data contract; and
- an act of populating the associated data object with the recovered one or more data fields.

30. A computer program product in accordance with claim 26, the method further comprising the following:
- an act of receiving a request for a description of services;
- an act of evaluating a service object to identify one or more methods provided by the service object;
- an act of evaluating a plurality of parameters of the service object to determine which have data contracts associated therewith;
- for each data contract that is associated with one or more of the plurality of data parameters;
- an act of converting the data contract into a schematized description of the data field types identified by the data contract; and
- an act of providing a schematized description of the one or more methods provided by the service object, along with each of the schematized descriptions of the data contracts.

31. A method as recited in claim 1, wherein the act of serializing the extracted data fields is only performed after extracting all of the data fields associated with the data contract.

32. A method as recited in claim 1, wherein the act of serializing the extracted data fields is performed, for at least some of the extracted data fields, after extracting said at least some of the extracted data fields, and prior to extracting all of the data fields associated with the data contract.

33. A method as recited in claim 1, wherein the act of determining whether the particular data field type comprises a mandatory or, alternatively, an optional data field type is performed by examining designators that are present within the data contract.

* * * * *